J. LÉONARD.
ELASTIC WHEEL.
APPLICATION FILED FEB. 7, 1911.
1,051,132.
Patented Jan. 21, 1913.
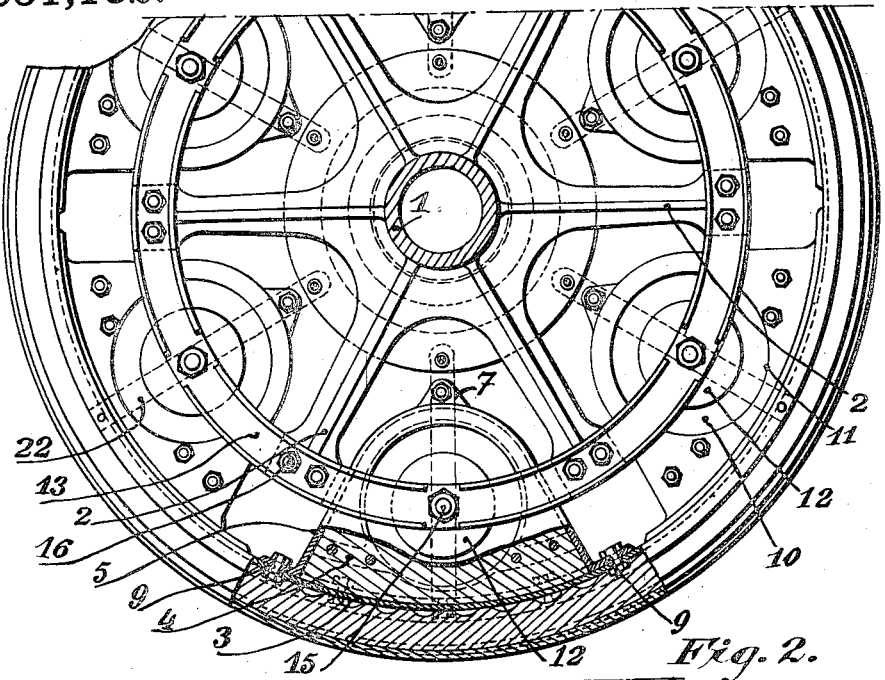
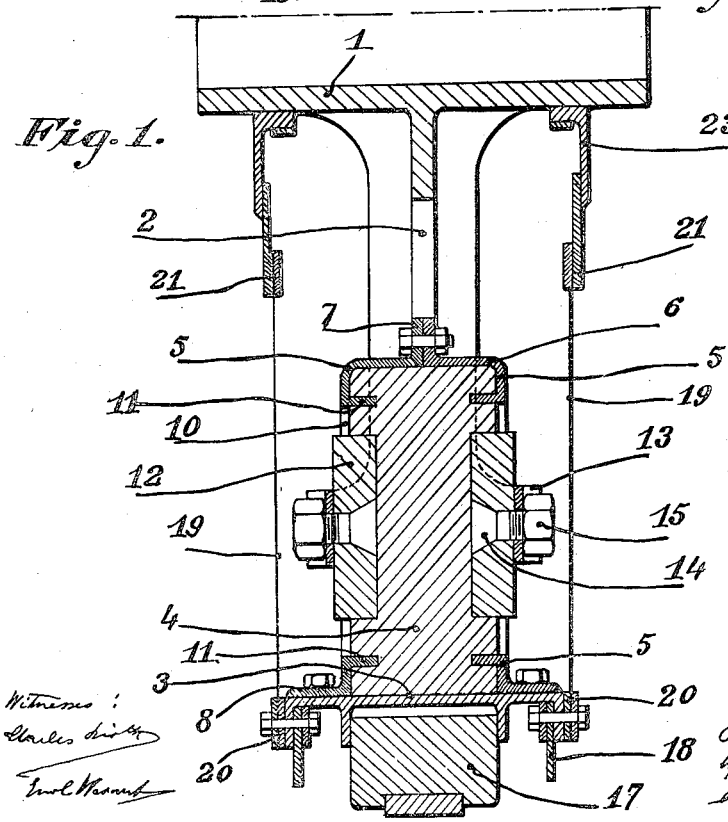

UNITED STATES PATENT OFFICE.

JULES LÉONARD, OF PARC-ST.-MAUR, FRANCE.

ELASTIC WHEEL.

1,051,132. Specification of Letters Patent. Patented Jan. 21, 1913.

Application filed February 7, 1911. Serial No. 607,203.

*To all whom it may concern:*

Be it known that I, JULES LÉONARD, a citizen of the French Republic, residing at Parc-St.-Maur, Seine, of the Republic of France, have invented certain new and useful Improvements in Elastic Wheels, of which the following is a specification.

There have become known a great many types of elastic wheels but they all suffer from certain inconveniences when they are used.

This invention relates to a new elastic wheel the hub of which is elastically suspended to the felly by means of a certain number of india-rubber elements.

In the accompanying drawings the improved elastic wheel is shown.

Figure 1 is a radial section; Fig. 2 is a side view of the improved elastic wheel partially in vertical section.

The hub of the wheel consists of a central part or bushing 1 cast or molded and carrying a certain number of radial arms 2. Upon the inner surface of the felly 3 india-rubber elements 4 are fixed in the following manner: Each element 4 is inclosed between two metal cups 5—6 which, although they maintain the element securely, allow of sufficient elasticity. The said cups 5 and 6 have each a lug 7 situated in the central plane of the wheel; the two corresponding cups 5, 6 are united by means of said lugs 7. The cups 5, 6 are fixed upon the felly by lateral flanges 8 and by means of two shoulders 9 at the ends of said flanges. Each cup has a circular opening 10, the rim of which is bent inward; the annular flange 11 thus formed penetrating into india-rubber mass 4. The india-rubber elements 4 have on either side a cavity which is concentric with the circular openings 10 and which cavities serve as housings for metal rollers 12. The connection between the hub and the india-rubber elements 4 consists of two hoops 13 of U iron which form an inner wheel rim. These hoops are fixed by means of screw bolts 14 and nuts 15 to the said metal rollers 12, and by means of nuts 16 to the radial arms 2. The distance between said two hoops 13 is slightly greater than that between the two sides of the cups 5—6.

Upon the felly 3 a tread 17 of any known construction is fixed. At either side of the tread 17 vertical rings 18 are arranged which serve as mud guards.

The wheel is inclosed at both sides by canvas disks 19 impregnated with india-rubber solution. Said canvas disks are clamped in at one extremity between two flat rings 20 and at the other extremity between two similar rings 21. The rings 20 are fixed to the felly 3 and they are connected with the rings 21 by radial connecting rods 22 shown in Fig. 2 in dotted lines. The outer one of the rings 21 has an extension directed toward the hub and engaging under an annular disk 23 of india-rubber.

This improved elastic wheel operates as follows: The hub is suspended on the felly by means of the india-rubber elements 4; if through the contact with the road a deformation is produced, all the elements participate in the same, every one to the same extent. One part of the india-rubber of the elements 4 is clamped in and does not participate in the deformation, only that part of the india-rubber which is situated within the openings 10 keeps its entire elasticity. The openings 10 of all the casings for the india-rubber elements are identical and as the corresponding masses of india-rubber receive similar efforts from their rollers, all the masses work identically at every moment, the lower half circles of said masses working under compression and the upper half circles working under extension. At one revolution of the wheel the center of the roller 12 describes a small circle concentric with the opening 10.

I claim:

An improved elastic wheel comprising in combination the wheel hub, radial arms of said hub, two U-shaped rings fixed to the outer ends of said radial arms one at either side, the felly of the wheel, metal shoes made of two separate parts fixed at either side of the felly so that they project each between two radial arms of the hub said shoes having large central openings, india rubber blocks inclosed between the two parts of said shoes and provided with cavities in their sides, metal disks corresponding in shape with the cavities of said india rubber elements in which they are located, and means for fixing said disks to the U-shaped rings so that they clamp in the middle part of said india rubber elements substantially as described and shown and for the purpose set forth.

In witness whereof I have hereunto set my hand in the presence of two witnesses.

JULES LÉONARD.

Witnesses:
 DEAN B. MASON,
 ALBERT DE CARSALADE.